United States Patent [19]

Furia

[11] 4,185,122
[45] Jan. 22, 1980

[54] METHOD FOR INHIBITING THE FOAMING OF AQUEOUS SOLUTIONS CONTAINING A POLYMERIC DYE

[75] Inventor: Thomas E. Furia, San Jose, Calif.

[73] Assignee: Dynapol, Palo Alto, Calif.

[21] Appl. No.: 932,085

[22] Filed: Aug. 8, 1978

[51] Int. Cl.$^2$ .............................................. A23L 1/27
[52] U.S. Cl. ................................... 426/250; 426/540; 426/329
[58] Field of Search ............... 426/250, 540, 329, 590

[56] References Cited
U.S. PATENT DOCUMENTS

| | | | |
|---|---|---|---|
| 2,967,109 | 1/1961 | Morgan et al. | 426/329 |
| 3,100,151 | 8/1963 | Breivik | 426/329 |
| 3,436,227 | 4/1969 | Bergeron et al. | 426/329 |
| 3,937,851 | 2/1976 | Bellanca | 426/540 |
| 3,940,503 | 2/1976 | Bellanca | 426/540 |
| 4,105,802 | 8/1978 | Cho et al. | 426/329 |

Primary Examiner—Jeanette M. Hunter
Attorney, Agent, or Firm—William H. Benz

[57] ABSTRACT

Foaming of aqueous solutions containing a polymeric dye can be inhibited by use of glycerol monooleate, glycerol dioleate and mixtures thereof.

12 Claims, No Drawings

METHOD FOR INHIBITING THE FOAMING OF AQUEOUS SOLUTIONS CONTAINING A POLYMERIC DYE

BACKGROUND OF THE INVENTION

1. Field of the Invention:

The present invention relates to a method of preventing or eliminating the foaming of polymeric dye-containing aqueous solutions, particularly soft drink compositions, by use of glycerol monooleate, glycerol dioleate or a mixture thereof.

2. Description of the Prior Art:

Polymeric dyes have been recently proposed as satisfactory replacements for FD&C REd #2, which can no longer be used in foods, drugs and cosmetics in the United States. When polymeric colors are used in edibles, if the size of the molecules of polymeric color exceeds a certain limit—usually a molecular size of from about 1000 to 2000 Daltons—and if the color compounds do not break down and thus maintain this size, the polymeric colors are not absorbed through the walls of the gastrointestinal tract. This means that when such materials are consumed, they essentially pass directly through the gastrointestinal tract. They are not taken into the body or its systemic circulation and thus any risk of possible systemic toxicity is eliminated. An excellent red polymeric colorant, which shows promise as an especially desirable replacement for existing red food colors such as FD&C Red #2, is an anthrapyridone known as Poly R TM -481. Poly R TM -481 is an acetylated version of a colorant having the structural formula

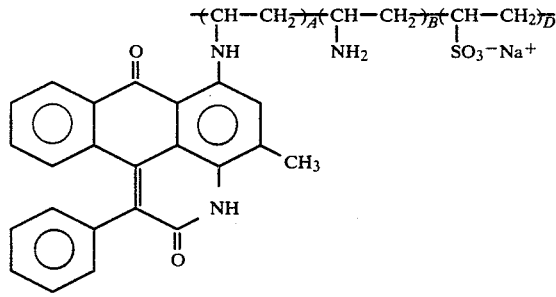

(I)

wherein about 95% of the free backbone amines have been converted to

groups and wherein A+B+D equals about 900 (A equals about 180, B equals about 360 and D equals about 360). Equivalent to Poly R TM -481 for the purposes of this invention are the corresponding polymeric colorants wherein about 80 to 98% of the free backbone amines have been acetylated.

Poly R TM -481 can be prepared by a reaction sequence which begins with 1-amino-2-methyl-4-bromoanthraquinone. That material is reacted with phenylacetyl chloride, suitably in an aprotic organic solvent such as toluene, at an elevated temperature. The resultant addition product of the formula

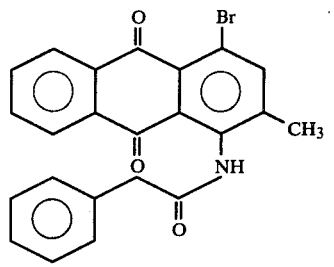

is then cyclized with base to afford a compound of the formula

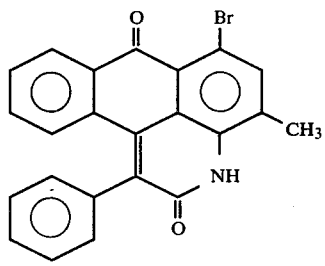

which is then reacted with vinylamine-vinylsulfonate copolymer. This amine displacement is an adaption of the classic Ullmann reaction and is carried out in water or mixed water/organic solvent and base and with a copper catalyst such as $Cu_2Cl_2$. The resultant polymer of formula (I) is then acetylated by reacting it with acetic anhydride in aqueous base. The red solution thus obtained yields, after lyophilization, a solid red product corresponding to formula (I) except that about 95% of the free backbone amines have been converted to

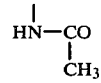

groups. Poly R TM -481 and related anthraquinones are disclosed and claimed in U.S. patent application Ser. No. 751,857, filed Dec. 17, 1976, assigned to the assignee hereof, and hereby expressly incorporated by reference in its entirety and relied upon.

The use of Poly R TM -481 in aqueous solutions, particularly in carbonated beverages, has unfortunately been limited by the excessive foaming which has been observed in such solutions. Foaming is considered a significant drawback to the use of this polymeric dye in carbonated beverages since it would result in filling problems during high-speed bottling operations. Foaming could result in excessive spillage and short-filled packaging in both bottling and canning operations.

SUMMARY OF THE INVENTION

It has now been found that the foaming of aqueous solutions, particularly carbonated beverages, containing the polymeric dye Poly R TM -481 can be prevented or eliminated by the addition of glycerol monooleate, glycerol dioleate or a mixture thereof to such solutions.

DETAILED DESCRIPTION OF THE INVENTION

Glycerol monooleate (GMO) and Glycerol mono- and dioleate (GMDO) are food-grade additives usually considered to be emulsifiers and solvents. They have now been found to be surprisingly effective, at low concentrations, when used as defoamers for aqueous solutions of Poly R TM -481. This utility is completely unexpected and particularly surprising in view of the fact that other food grade additives, including those generally considered to be food grade defoamers, have been found to be ineffective or to actually increase foaming in aqueous solutions containing Poly R TM -481.

The invention will appear more fully from the examples which follow. In these examples, the following materials and methods were used:

Poly R TM -481 was employed for all tests as a 3000 ppm stock solution in deionized water. The stock solution was prepared by heating spray dried Poly R TM -481 in water to 90° C. to insure that the dye was completely solubilized. Unless otherwise specified, tests were conducted by diluting the stock solution with deionized water to a final concentration of 1500 ppm Poly R TM -481 since this level of dye produced sufficient foam for accurate measurements.

All water soluble additives were dissolved directly in the make-up water used to dilute the 3000 ppm Poly R TM -481 stock solution to 1500 ppm. Water insoluble or water dispersible additives were incorporated via a 50/50 blend (w/w) in ethanol or, when applicable, into a portion of finished carbonated beverage containing essential flavoring oils. Initial tests were conducted using 100 ppm of additive and 1500 ppm Poly R TM -481. For insoluble additives, this introduced 100 ppm of ethanol into the test solutions; this level of ethanol did not affect foaming.

In the tests described below, foam height was measured as a function of time by filling a 250 ml graduated glass cylinder, fitted with a ground glass stopper, with 20 ml of test solution. The test solution and a control were simultaneously agitated manually for 25 vertical strokes after which the initial foam height and its decay as a function of time were measured in milliliters.

In the examples, the GMDO used was a commercially available mixture of mono- and diglycerides of oleic acid containing 47–50% alpha monoglyceride, with a total monoglyceride content of 54–59%. It was a light amber clear liquid (<1 Gardner Unit) at 75° F., with an HLB value (±1) of 2.8, an iodine value of 74–78 and a viscosity at 75° F. of 150 cps.

EXAMPLE 1

The foam-inhibiting characteristics of various food grade additives in solutions containing 1500 ppm Poly R TM -481 were compared. The results are tabulated below.

| Additive, 100 ppm | Initial Foam Height, ml | Foam Height After 30 Seconds, ml |
|---|---|---|
| None | 15 | 10 |
| Glycerine | 15 | 8 |
| Propylene Glycol | 20 | 18 |
| Polyethylene Glycol 600 | 20 | 16 |
| Polysorbate 20 (Polyoxyethylene 20 Sorbitan Monolaurate) | 25 | 20 |
| Polysorbate 80 (Polyoxyethylene 20 Sorbitan Monooleate) | 25 | 20 |
| Dioctyl Sodium Sulfosuccinate | 35 | 30 |
| Ethanol* | 15 | 10 |
| GMO (Glycerol Monooleate) + Ethanol | 10 | 2 |
| GMDO (Glycerol Mono- and Dioleate) + Ethanol | <0.5 | <0.5 |
| Octyl Alcohol + Ethanol | 13 | 10 |
| Polyoxyethylene 50 Stearate + Ethanol | 17 | 15 |

*Solvent for water insoluble additives

Thus, 100 ppm of GMDO was found to effectively inhibit the copious foam resulting from the agitation of a 1500 ppm aqueous solution of Poly R TM -481. GMO was also found to be effective. Other additives, including those categorized as food grade defoamers (i.e., octyl alcohol, polyoxyethylene stearate, polyoxyethylene sorbitan monolaurate and polyoxyethylene sorbitan monooleate), were ineffective at the level tested or in some instances enhanced foaming. Dioctyl sodium sulfosuccinate and the polysorbates enhanced foaming of agitated solutions of Poly R TM -481 at 100 ppm.

EXAMPLE 2

The prevention of foaming in a 1500 ppm solution of Poly R TM -481 by various levels of GMDO was studied, with the results tabulated below:

| Time (min) | Foam Height in Milliliters After Agitation | | | | |
|---|---|---|---|---|---|
| | Control | 10 ppm ETOH* | 1 ppm ETOH* | 10 ppm GMDO | 1 ppm GMDO |
| 0 | 15 | 15 | 15 | <0.5 | 5 |
| 0.5 | 10 | 10 | 10 | <0.5 | 2 |
| 1.0 | 10 | 10 | 8 | <0.5 | 1 |
| 2.0 | 8 | 8 | 8 | <0.5 | <0.5 |
| 4.0 | 5 | 5 | 5 | <0.5 | <0.5 |
| 10 | 5 | 5 | 5 | <0.5 | <0.5 |
| 15 | 5 | 5 | 5 | <0.5 | <0.5 |

*Ethanol was the cosolvent for GMDO at equal parts concentration.

Although 1.0 ppm GMDO did reduce foaming, 10 ppm GMDO was found to be considerably more effective. The use of 1 and 10 ppm ethanol as a cosolvent for GMDO did not affect foam height.

This test also showed the persistence of the foam resulting from agitation of an aqueous Poly R TM -481; even 15 minutes afer agitation, a 5 ml foam height was still evident.

EXAMPLE 3

To 10 ml of a 1500 ppm solution of Poly R TM -481 containing 20 ppm GMDO and 20 ppm of ethanol as a cosolvent, 10 ml of carbonated beverage was added at room temperature in a 250 ml graduated cylinder. The final solution contained: 750 ppm Poly R TM -481, 10 ppm GMDO and 10 ppm ethanol. In another vessel, the carbonated beverage was added to the dye solution containing only ethanol; this served as a control.

The following results were obtained:

| | Foam Height in Milliliters Upon Addition of Carbonated Beverage | | |
|---|---|---|---|
| Time (min) | No Additive | 10 ppm Ethanol | 10 ppm GMDO* |
| 0 | 50 | 50 | 5 |
| 0.5 | 30 | 35 | <0.5 |
| 1.0 | 25 | 25 | <0.5 |
| 5.0 | 10 | 10 | <0.5 |
| 10.0 | 10 | 10 | <0.5 |

*plus 10 ppm ethanol as cosolvent

As indicated above, immediately upon the addition of 10 ml of carbonated beverage to 10 ml of 1500 ppm solution of Poly R TM -481, a thick copious foam with a height of 50 ml was produced. The foam was quite stable and after 10 minutes a 10 ml foam height persisted. With 10 ppm GMDO in the Poly R TM -481 solution, only 5 ml of foam was produced immediately and this decayed within 30 seconds to an insignificant amount (<0.5 ml). The use of ethanol (10 ppm) did not affect foaming.

These surprising results indicate that filling problems in a finished carbonated beverage due to foaming are greatly reduced or eliminated by the use of GMDO.

EXAMPLE 4

GMDO was incorporated directly into a carbonated beverage a 20 ppm. The essential oils in the beverage were obviously sufficient to solubilize the small amount of GMDO.

To 10 ml of a 1500 ppm solution of Poly R TM -481 in a graduated cylinder was added 10 ml of carbonated beverage. The GMDO concentration in the final test solution was 10 ppm. As a control, 10 ml of carbonated beverage without GMDO was added to 10 ml of 1500 ppm Poly R TM -481 solution.

The following results were observed:

| | Foam Height in Milliliters | |
|---|---|---|
| Time (min) | Control | 20 ppm GMDO |
| 0 | 45 | 5 |
| 0.25 | 60 | <0.5 |
| 0.50 | 50 | <0.5 |
| 1.0 | 30 | <0.5 |
| 5.0 | 15 | <0.5 |
| 10.0 | 10 | <0.5 |

As indicated in the above table, when carbonated beverage without GMDO was added to an aqueous stock solution of Poly R TM -25 481, foaming developed at an increasing volume during the addition. This foaming subsided slowly within 0.5 minute but considerable foam persisted throughout a 10 minute observation period. With 20 ppm GMDO in the carbonated beverage, foam developed only slightly during the addition and was <0.5 milliliters throughout the remainder of the observation period.

This was a particularly difficult test since the carbonated beverage was being dropped onto the Poly R TM -20 481 stock solution and there was a great tendency towards foaming from the liberation of $CO_2$. In production, the finished beverage containing dye would normally be prepared first and carbonation conducted as the final operation during filling.

EXAMPLE 5

GMDO was incorporated into a finished, clear lemon beverage via the flavoring oils and tested for defoaming activity in the presence of Poly R TM -481 as follows:

1. A lemon beverage extract, suitable for flavoring clear carbonated beverages at a rate of one ounce per six gallons of water (1.24 g/liter), was prepared by dissolving one ounce of terpeneless lemon oil per gallon of food grade ethanol (0.748 g/100 ml).

2. GMDO was dissolved directly in the beverage extract [(1) above] so as to result in GMDO levels of 10 ppm and 100 ppm in the finished beverage. For example, 0.01 g GMDO was added to 1.24 g of extract for the 10 ppm level and 0.1 g GMDO was added to 1.24 g of extract for the 100 ppm level.

3. Invert liquid sugar was diluted with water to 28 Baumé° and the beverage extract containing the GMDO was added to the syrup with agitation.

4. The syrup containing the extract and GMDO was further diluted 1:4 with water containing sufficient citric acid to result in a finished beverage containing 0.16% acidulant.(*) In this fashion, the following beverages were prepared:

| | Concentration in Gram/Liter of Finished Beverage | | |
|---|---|---|---|
| Ingredients | Control | Solution I | Solution II |
| Flavor Extract | 1.24 | 1.24 | 1.24 |
| GMDO | — | 0.1 | 0.01 |
| Citric Acid | 1.6 | 1.6 | 1.6 |
| 28° Be Syrup | 250 ml | 250 ml | 250 ml |
| Deionized Water,QS | 1 liter | 1 liter | 1 liter |

(*) At this junction, lemon beverages are usually carbonated with 3 volumes of $CO_2$. In this example, the beverages were not carbonated.

5. Ten ml of a 3000 ppm solution of Poly R TM -481 was placed in a 250 ml graduated cylinder and 50 ml of beverage (prepared as described in steps (1) to (4) above) was added. This dilution resulted in a final Poly R TM -481 concentration of 500 ppm. The solutions were agitated as described previously and foam height was measured as a function of time.

| | Foam Height in Milliliters | | |
|---|---|---|---|
| Time (min) | Control | Solution I (100 ppm GMDO) | Solution II (10 ppm GMDO) |
| 0 | 50 | 10 | 10 |
| 0.5 | 50 | <0.5 | 1 |
| 1.0 | 50 | <0.5 | <0.5 |
| 5.0 | 40 | <0.5 | <0.5 |
| 10.0 | 40 | <0.5 | <0.5 |

As indicated in the table above, the foam resulting from the agitation of beverage prepared in this fashion without GMDO is extremely high and stable (40 mls after 10 minutes). Had the beverages been carbonated, foaming would be dramatically enhanced. With beverages prepared to contain 10 ppm and 100 ppm GMDO, foam development was minimal and decayed rapidly.

This example demonstrates that GMDO can be incorporated via the flavoring oils and still remain effective in the finished beverage.

As is evident from the foregoing, the present invention provides a method of preparing a substantially foam-free aqueous solution colored with a polymeric dye which comprises admixing water, Poly R TM -481 and an effective foam-inhibiting amount of glycerol dioleate, glycerol monooleate or a mixture thereof. The invention further provides substantially non-foaming compositions comprising water, Poly R ™ -481 and glycerol mono- and/or dioleate. The invention is of particular value when the aqueous solution is a beverage comprising water, flavoring, and a sweetening agent, especially when the beverage is also carbonated. Thus, in a preferred embodiment, the present invention provides a carbonated soft drink composition comprising water, flavoring, sweetener, Poly R ™ -481 and an effective foam-inhibiting amount of glycerol mono- or dioleate or a mixture thereof. The flavoring agent can be any of a variety of natural and/or artificial flavors. Similarly, the sweetener can be selected from the numerous known natural and artificial, nutritive and non-nutritive, sweetening agents and various mixtures thereof. Such sweeteners include, but are not limited to, sucrose and saccharin as well as the other known sweetening agents, described, for example, in U.S. Pat. No. 3,876,816. Other possible sweetening agents for use in the instant compositions include nonabsorbable, nonnutritive, water-soluble sweetener compositions of the general formula (Am)$_n$C wherein Am is an active sweetening group, ～ is a covalent bond, C is a polymeric molecule, and n is at least one. Such compositions are described and claimed in U.S. Pat. No. 3,876,816.

Although it has been found to be particularly convenient to use commercially available GMDO as the foam inhibitor, the present invention is not to be construed as being limited to such a mixture but encompasses the use of any mixture of glycerol monooleate and glycerol dioleate, as well as the use of glycerol dioleate alone and the use of glycerol monooleate alone.

While the invention has been described in terms of various preferred embodiments, the skilled artisan will appreciate that various modifications, substitutions, omissions and changes may be made without departing from the spirit thereof. Accordingly, it is intended that the scope of the present invention be limited solely by the scope of the following claims.

What is claimed is:

1. A method of preparing a substantially foam-free aqueous solution colored with a polymeric dye, which comprises admixing water and a polymeric dye having the structural formula

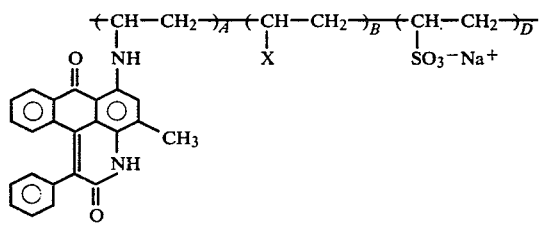

wherein about 80 to 98% of the X groups are

groups, the remaining X groups are free

groups and A+B+D equals about 900, with an effective foam-inhibiting amount of a foam-inhibitor selected from the group consisting of glycerol monooleate, glycerol dioleate, and a mixture of glycerol monooleate and glycerol dioleate.

2. The method of claim 1 wherein about 95% of the X groups in the polymeric dye are

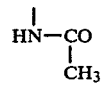

groups.

3. The method of claim 2 wherein the foam-inhibitor is a mixture of glycerol monooleate and glycerol dioleates.

4. A composition comprising water; a polymeric dye having the structural formula

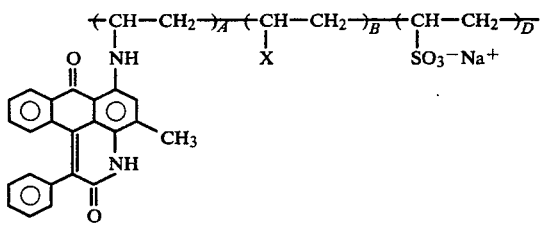

wherein about 80 to 98% of the X groups are

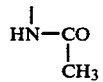

groups, the remaining X groups are free

groups and A+B+D equals about 900; and an effective foam-inhibiting amount of a foam-inhibitor selected from the group consisting of glycerol monooleate, glycerol dioleate, and a mixture of glycerol monooleate and glycerol dioleate.

5. The composition of claim 4 wherein about 95% of the X groups in the polymeric dye are

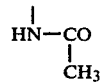

groups.

6. The composition of claim 5 wherein the foam-inhibitor is a mixture of glycerol monooleate and glycerol dioleate.

7. A beverage comprising water; flavoring and sweetening agents; a polymeric dye having the structural formula

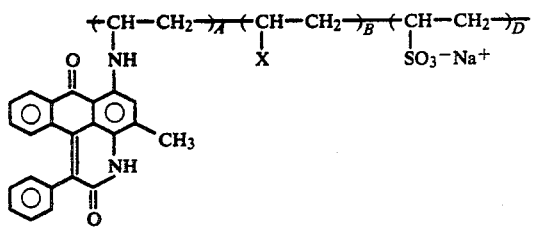

wherein about 80 to 98% of the X groups are

groups, the remaining X groups are free

groups and $A+B+D$ equals about 900; and an effective foam-inhibiting amount of a foam-inhibitor selected from the group consisting of glycerol monooleate, glycerol dioleate, and a mixture of glycerol monooleate and glycerol dioleate.

8. The beverage of claim 7 wherein about 95% of the X groups in the polymeric dye are

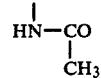

groups.

9. The beverage of claim 8 wherein the foam-inhibitor is a mixture of glycerol monooleate and glycerol dioleate.

10. The beverage of claim 7, impregnated with carbon dioxide.

11. The beverage of claim 8, impregnated with carbon dioxide.

12. The beverage of claim 9, impregnated with carbon dioxide.

* * * * *